May 31, 1966 R. D. McCLAIN 3,254,281
POWER CAPACITOR DEVICE HAVING IMPROVED
TEMPERATURE OPERATING CHARACTERISTICS
Filed Oct. 29, 1964 3 Sheets-Sheet 3

3,254,281
POWER CAPACITOR DEVICE HAVING IMPROVED TEMPERATURE OPERATING CHARACTERISTICS
Robert D. McClain, Bloomington, Ind., assignor to Westinghouse Electric Corporation, East Pittsburgh, Pa., a corporation of Pennsylvania
Filed Oct. 29, 1964, Ser. No. 407,316
6 Claims. (Cl. 317—243)

The present invention relates to power capacitors and more particularly to power capacitors having improved temperature operating characteristics.

In the construction of power capacitor devices, one or more convolutely wound capacitor sections are disposed with liquid dielectric in a casing and the sections are interconnected to form a capacitance circuit between external device terminals. The casing is usually a metallic box-like structure with an insulative bushing provided for one or more of the terminals which operate at elevated potential.

Each capacitor section is normally formed by winding a pair of aluminum or other conductive foil strips with a pair of insulative paper or other dielectric strips interleaved therebetween. In order to avoid corona starting voltage conditions and dielectric breakdown, the foil-to-foil voltage within the sections is controlled by limiting the total section voltage. When required, the section voltage limitation is achieved in the capacitance circuit by connecting a predetermined plurality of sections (or parallel groups of sections) in series so that the total device voltage is divided among the series sections or section groups.

Since the section foils thus are operated at various potential elevations, it is necessary that the entire section assembly be surrounded by dielectric material so as to provide an insulative barrier between the capacitor sections and the casing. However, such material simultaneously introduces substantially increased thermal impedance to removal of heat generated in the section dielectric material and in the section foils. The normal operating temperature of the section foil and dielectric is thus measurably higher because of the casing insulation thermal impedance. Probable device life is accordingly shorter than what it otherwise could be.

In accordance with the broad principles of the present invention, a capacitor device comprises one or more capacitor sections each of which has conductive foil wound therein so as to provide the necessary number of voltage steps to operate within foil-to-foil voltage limitations. The outermost foil of each section is appropriately extended for interconnection with that of other sections or with the casing so as to be at or near casing potential thereby eliminating the need for casing insulation and providing a basis for materially improved removal of generated heat. Lower device operating temperature and longer device life can thus be achieved.

It is therefore an object of the invention to provide a novel power capacitor device which is characterized with improved operating life.

Another object of the invention is to provide a novel power capacitor device which is characterized with improved heat dissipation.

An additional object of the invention is to provide a novel power capacitor device in which the need for a dielectric barrier between capacitor sections and the casing is eliminated.

It is a further object of the invention to provide a novel power capacitor device in which the foil-to-foil voltage in individual sections can be limited without requiring a voltage dividing series connection of a plurality of capacitor sections.

Another object of the invention is to provide a novel power capacitor device which can operate at comparatively higher power levels for a given device temperature rise.

These and other objects of the invention will become more apparent upon consideration of the following detailed description along with the attached drawings, in which.

Figure 1:
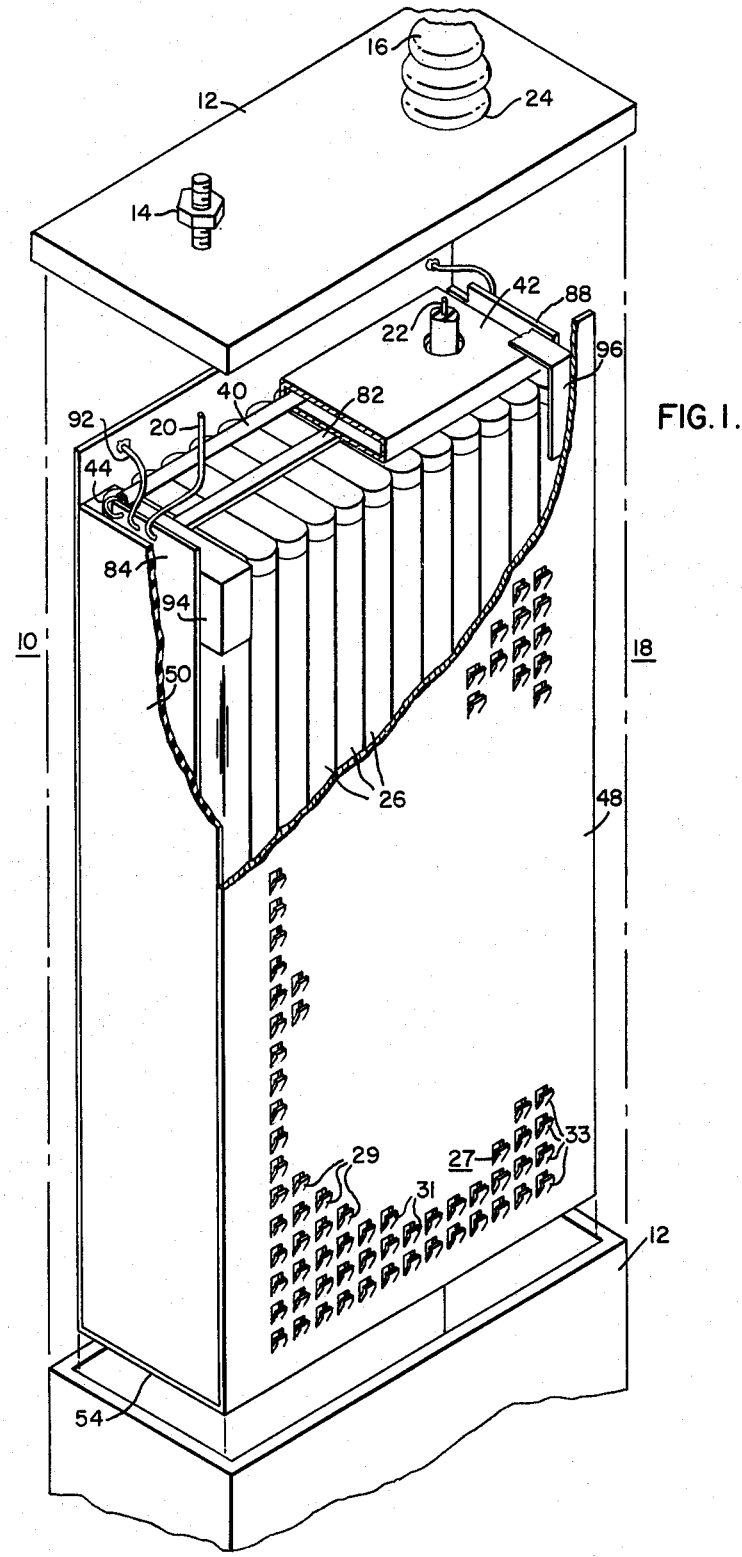
FIGURE 1 shows an exploded perspective view of a capacitor device constructed in accordance with the principles of the invention and having portions thereof removed for the purpose of clarifying the structure.
Figure 6:
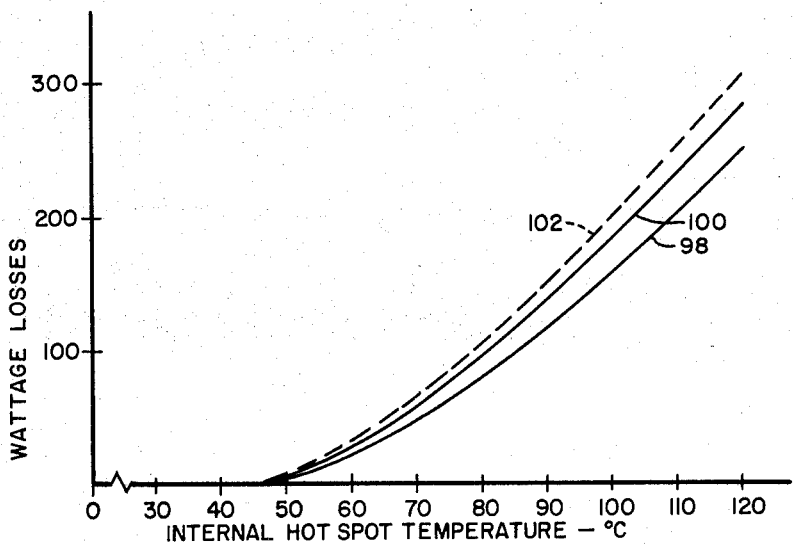

FIG. 6 graphically shows a sample thermal performance of the capacitor of FIG. 1.

More specifically, there is shown in FIG. 1 a single phase power capacitor device 10 having a weatherproof metallic casing 12 with external terminals 14 and 16 to which an internally located capacitor section subassembly 18 is connected by a connector 20 and an insulated connector 22. In this instance, the terminal 16 is provided with a bushing 24 for operation at an elevated potential and the terminal 14 is electrically common or at ground potential with the casing 12. Plural (say three) phase devices can also be constructed in accordance with the invention.

Figure 5:
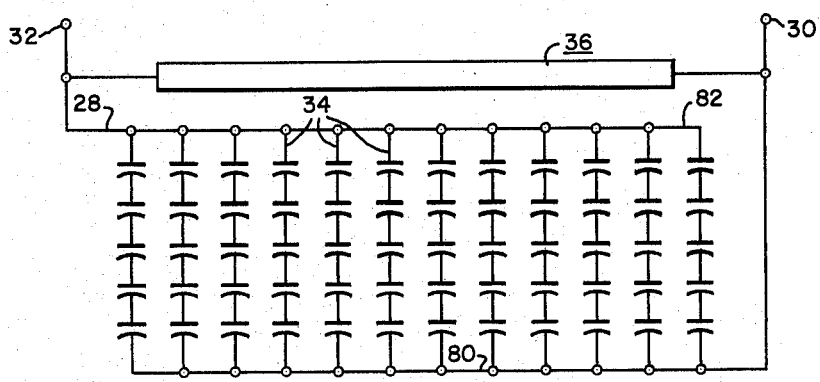
FIG. 5 shows a schematic electrical circuit for the capacitor of FIG. 1.

The section sub-assembly 18 comprises at least one but in this instance a plurality of capacitor sections 26 interconnected to form a single-phase capacitor circuit 28 (FIG. 5) between terminals 30 and 32 which correspond respectively to the device terminals 14 and 16. In the schematic of FIG. 5, each capacitor section circuit within the overall circuit 28 is designated by the reference character 34.

Figure 3:
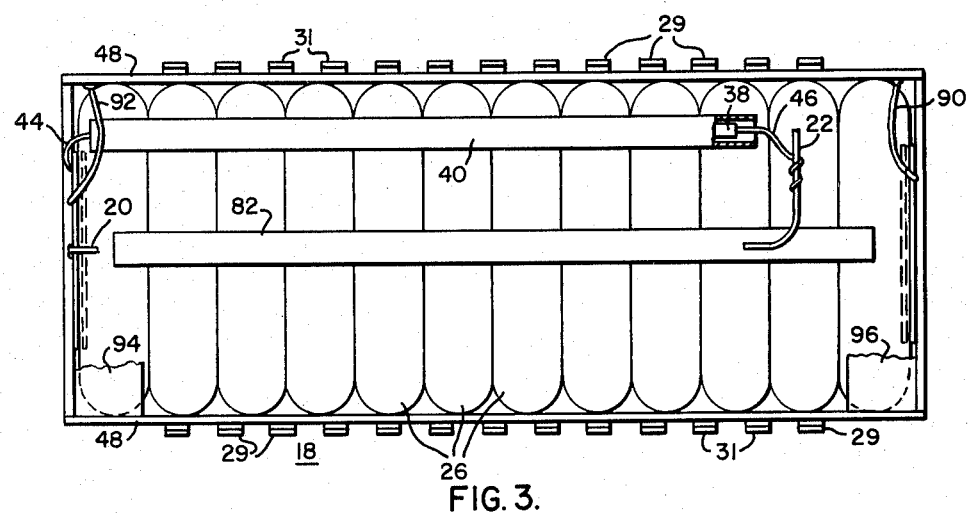
FIG. 3 shows a top view of the structure shown in FIG. 2 with a top insulative sheath removed from the structure.
Figure 2:
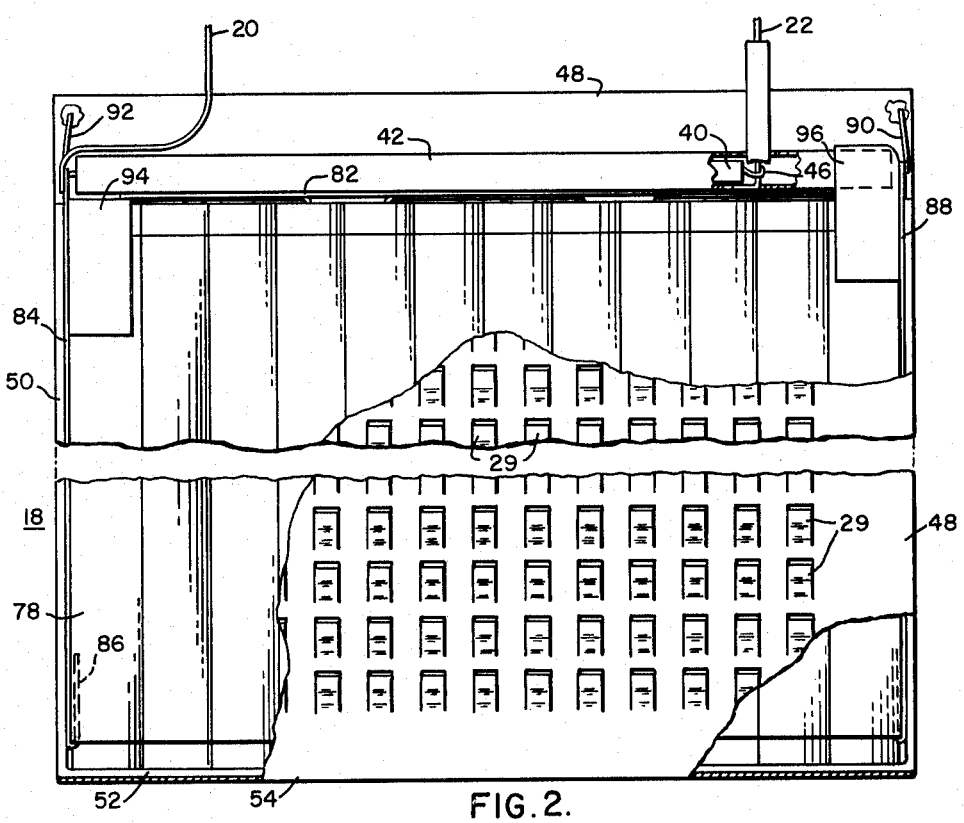
FIG. 2 shows a front elevational view of a capacitor sub-assembly of the structure shown in FIGURE 1.

As indicated, a resistive circuit 36 is shunted across the entire capacitance circuit 28 for the usual purpose of discharging the capacitor plates to a safe voltage level after disconnection from service. In the device of FIG. 1, the resistive circuit 36 is realized by means of resistors 38 disposed in an insulative tube 40 which in turn is disposed within a box-like insulative sheath 42 on top of the section sub-assembly 18. The resistors 38 are connected to the terminal connectors 20 and 22 through leads 44 and 46 (FIG. 3).

To facilitate insertion of the section sub-assembly 18 into the casing 12 during manufacture, a metallic (for example steel) U-shaped channel member 48 is disposed about the major sides and the bottom of the sub-assembly 18. Further, a pair of conductive or insulative L-shaped panel members 50 can be disposed adjacent each end of the sub-assembly 18 to protect the section end faces. A horizontal portion 52 of each member 50 can be disposed above or below bight portion 54 of the channel member 48.

The channel member 48 can also serve as an intermediate agent for heat transfer from the sections 26 to the casing 12 and the ambient. To provide utility in this functional aspect, resilient means 27 are preferably provided on the outer sides of the upstanding channel legs for engagement with the adjacent inner surface of the casing 12. In this manner, substantial metallic direct heat transfer cross-section can be maintained under most operating conditions including those in which relatively elevated operating temperatures cause liquid dielectric expansion and outward bulging of the casing sides.

The resilient means 27 can have various forms to produce point, line or surface engagement with the casing, but preferably are outwardly lanced fingers 29 having relatively flat ends 31 for substantial surface engagement with the casing 12. The fingers 29 can be provided in any desired geometric arrangement over the channel sides but preferably are arranged to promote uniform heat removal such as in rows 33 spaced along the channel side height. As the capacitor temperature fluctuates and the dielectric contraction and expansion causes the distance to vary between the casing 12 and the channel 48, the spring fingers 29 move in and out to maintain a relatively constant and relatively high conductivity heat path from the sections 26 to the casing 12.

Figure 4:
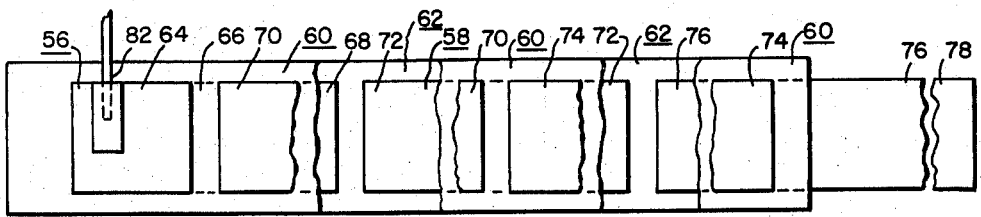
FIG. 4 shows a lay-out view in which the internal structure of a section of the capacitor of FIG. 1 is illustrated.

Each section 26 is preferably structured as indicated in FIG. 4 so as to provide the number of voltage steps required for meeting foil-to-foil voltage limitations. However, other geometric or material arrangements can also lead to whatever voltage step performance is needed for the sections 26.

Specifically, the convolute winding of a section 26 is begun with a pair of foil strips (such as aluminum strips) 56 and 58 and with a pair of dielectric strip means 60 and 62 interleaved therebetween in the usual manner. A predetermined length of the foil strip 56 is wound to form inner end capacitor plate foil 64, and the foil strip 56 is then cut. The foil strip 58 and the interleavings 60 and 62 are wound to a predetermined extent before the foil strip 56 is again interposed in the winding. For example, the foil strip 56 can be restarted after one or two inches of interleavings 60 and 62 is wound beyond the cutoff point of the capacitor plate 64 (as indicated by the reference 66). Greater or lesser spacing can of course be employed. In addition, if desired, a special insulative material (not shown) can be inserted in the space between the end of the plate foil 64 and the restart end of the foil strip 56.

Both foils and both interleavings are further convolutely wound until the foil strip 58 is cut to form capacitor plate foil 68 with a predetermined length. As in the previous case, the foil strip 58 is restarted in the winding with a predetermined spacing of interleaving from the cutoff end of the capacitor plate foil 68.

Winding is continued until capacitor foil plate 70 is formed from the foil strip 56, and is further continued as described until the necessary or desired number of foil plates are formed in the convolute section 26. In this instance, a total of six foil plates 64, 68, 70, 72 74 and 76 are formed in each section 26. The resulting electrical circuitry is schematically illustrated in the section circuits 34 in FIG. 5 each of which includes a total of five voltage steps.

The sections 26 thus are internally arranged with voltage steps provided by the foil plates 64, 68, 70, 72 and 74 so that specified device voltage, power and capacitance ratings can be achieved without exceeding predetermined limitations on foil-to-foil voltage within the sections 26. When the foil-to-foil voltage limit is less than the device voltage rating, the sections 26 accordingly can all be connected in parallel (FIG. 5) without any requirement for series section groups conventionally required to achieve voltage division.

Significantly, the permitted section grouping enables the outmost section foil turns to be disposed at casing potential so as to eliminate the need for casing insulation. To facilitate the parallel interconnection of the sections 26 and the connection of each section 26 to the casing 12 as described, it is therefore preferred that the final or outer end capacitor plate foil 76 in each section 26 be wound for at least one or a part of one turn, but preferably more turns as indicated by the reference character 78, after the dielectric interleaving 60 and 62 has been terminated in the winding process. The outmost turns 78 in each section 26 thus provide one of the parallel connection means among the sections 26 (reference character 80 in FIG. 5), and, in addition, promote heat removal from the internal regions of the sections 26 to the casing 12. In a plural phase application, say in a three phase Y connected device, the turns 78 can serve as a connecting means to establish the common terminal of the phases.

Suitable means are employed for connecting the inner end plate foils 64 of the various sections 26 in common. Preferably, tabs 82 which are buried with the plate foil 64 during the winding process are employed for this purpose. As observed in FIG. 3, the tabs 82 are preferably disposed inwardly from the sides of the sub-assembly 18 for insulation level purposes, and are interconnected by solder or other means to form a common connection with the high voltage connector 22. The sheath 42 assures an insulation barrier between the tabs 82 and the resistors 38. In plural phase applications, tabs 82 of only those sections in a common phase would be connected in parallel.

After the sections 26 are wound, they are each pressed into a flattened convolute and arranged to form the sub-assembly 18. The outmost foil turns 78 of all the sections 26 are thus commonly connected together as previously noted because of the intersection contact pressure produced.

To establish a connection between the section end turns 78 and the device terminal 14, conductive means and preferably a conductive pressure plate 84 is disposed in pressure contact with one of the end sections 26. The terminal connector 20 as well as the resistor leads 44 are connected or soldered to the plate 84. If desired, the conductive plate 84 can be provided with an upturned lower end portion 86 which forms a pocket within which the end turns 78 of the adjacent end section 26 can be disposed. Generally, however, the large contact surface area of the plate 84 is adequate basis for establishing good contact with the section end turns 78.

A similar end plate 88 can be placed in pressure engagement with the opposite end section 26 so as to provide added circuit reliability and capacity. In particular, the plate 88 can be connected by suitable conductive means 90 to the U-channel 48 which in turn is connected through suitable conductive means 92 to the first mentioned conductive plate 84 (FIG. 3). A common potential for the section end turns 78, the channel member 48, the casing 12 and the terminal 14 is thus well assured. To maintain a reliable insulation barrier between the plates 84, 88 and the high voltage section tabs 82, folded insulative members 94 and 96 respectively can be disposed over the opposite end sections 26 of the sub-assembly 18 and between the end sections 26 and the respective plates 84 and 88.

Since the usual need for inserting casing insulation between the outer boundary of the capacitor sections 26 and the U-channel 48 or casing 12 is eliminated, a good thermal conduction path is provided for removal of capacitor dielectric and foil generated heat directly to the channel member 48 and the casing 12 through the outer section foil turns 78 and to some extent through other less direct heat flow paths. Further, because of the plurality of parallel current paths 34, current density can be held to a relatively low value to reduce current generated heat ($I^2R$ losses). Moreover, there is wide latitude of choice in setting the thickness of the flattened sections 26 thereby providing another effective design control over the problem of removing heat from the sections 26 and particularly the central regions thereof.

In performance, a sample capacitor device constructed in accordance with the principles of the invention provided materially improved temperature operation as indicated in FIG. 6. In the graph of FIG. 6, the curve 98 represents a conventionally wound capacitor having twenty four sections and conventional casing insulation. The curve 100 is representative of a capacitor having twelve voltage step sections and no casing insulation in accordance with the principles of the invention. The curve 102 is representative of the same voltage step capacitor with a U-channel having resilient heat conduction means as previously described. As indicated, for equal heat or wattage losses in the compared capacitors, the internal hot spot temperature of the voltage step capacitor (100) is consistently lower than that of the conventionally wound capacitor (98). The same is true of the voltage step capacitor (102) having the resilient means as compared with the voltage step capacitor (100) and the conventional capacitor (98).

The foregoing description has been presented only to illustrate the principles of the invention. Accordingly, it is desired that the invention be not limited by the embodiment described, but, rather, that it be accorded an interpretation consistent with the scope and spirit of its broad principles.

What is claimed is:

1. A power capacitor having a metal case, at least one convolute capacitor section disposed in the case, each capacitor section comprising a pair of metal foils interleaved with and separated by dielectric material, each of said foils being divided into a plurality of spaced portions, the spaced portions of each foil partially overlapping adjacent portions of the other foil to form a plurality of series related capacitor elements, means for making electrical connection to the inner end portion of one of said foils, the outer end portion of the other of said foils extending to the exterior of the capacitor section and the lateral surface of said other foil being in good thermally and electrically conductive relation with the side of said case.

2. A power capacitor having a metal case, a plurality of convolute capacitor sections disposed in the case, each capacitor section comprising a pair of metal foils interleaved with and separated by dielectric material, each of said foils being divided into a plurality of spaced portions, the spaced portions of each foil partially overlapping adjacent portions of the other foil to form a plurality of series related capacitor elements, means for electrically connecting together the inner end portions of one foil of each capacitor section, the outer end portion of the other foil of each capacitor section extending to the exterior of the section, the outer end portions of said other foils of adjacent capacitor sections being in electrical contact with each other and the lateral surfaces of said other foils being in good thermally and electrically conductive relation with the side of said case.

3. A power capacitor having a metal case, at least one convolute capacitor section disposed in the case, each capacitor section comprising a pair of metal foils interleaved with and separated by dielectric material, each of said foils being divided into a plurality of spaced portions, the spaced portions of each foil partially overlapping adjacent portions of the other foil to form a plurality of series related capacitor elements, means for making electrical connection to the inner end portion of one of said foils, the outer end portion of the other of said foils extending to the exterior of the capacitor section, a channel member of good thermal and electrical conductivity fitting in said case in good thermally conductive relation therewith, said capacitor sections being disposed in the channel member with said outer foil end portion in contact with the channel member, and means for making electrical connection to the channel member.

4. A power capacitor having a metal case, a plurality of convolute capacitor sections disposed in the case, each capacitor section comprising a pair of metal foils interleaved with and separated by dielectric material, each of said foils being divided into a plurality of spaced portions, the spaced portions of each foil partially overlapping adjacent portions of the other foil to form a plurality of series related capacitor elements, means for electrically connecting together the inner end portions of one foil of each capacitor section, the outer end portion of the other foil of each capacitor section extending to the exterior of the section, and the outer end portions of said other foils of adjacent capacitor sections being in electrical contact with each other, a channel member of good thermal and electrical conductivity fitting in said case in good thermally conductive relation therewith, said capacitor sections being disposed in the channel member with said outer foil end portions in contact with the channel member, and means for making electrical connection to the channel member.

5. A power capacitor as defined in claim 4 in which the channel member has a plurality of resilient members on its surface extending into engagement with the case.

6. A power capacitor having a metal case, a plurality of convolute capacitor sections disposed in the case, each capacitor section comprising a pair of metal foils interleaved with and separated by dielectric material, each of said foils being divided into a plurality of spaced portions, the spaced portions of each foil partially overlapping adjacent portions of the other foil to form a plurality of series related capacitor elements, means for electrically connecting together the inner end portions of one foil of each capacitor section, the outer end portion of the other foil of each capacitor section extending to the exterior of the section, and the outer end portions of said other foils of adjacent capacitor sections being in electrical contact with each other, a channel member of good thermal and electrical conductivity fitting in said case, said capacitor sections being disposed in the channel member, means for effecting electrical connection of said outer foil end portions to the channel member, means for making electrical connection to the channel member, and the channel member including means resiliently engaging the case to effect good thermally conductive relation therewith.

References Cited by the Examiner

UNITED STATES PATENTS

| 2,531,185 | 11/1950 | Wurster | 317—260 |
| 2,634,315 | 4/1953 | Allison et al. | 317—260 |
| 2,846,627 | 8/1958 | Doughty | 317—242 |
| 2,935,549 | 5/1960 | Woods. | |
| 2,984,457 | 5/1961 | Wulc | 174—16 X |
| 3,098,956 | 7/1963 | Hammer et al. | 317—243 |

FOREIGN PATENTS

| 689,865 | 4/1953 | Great Britain. |

ROBERT K. SCHAEFER, *Primary Examiner.*

JOHN F. BURNS, *Examiner.*

D. J. BADER, *Assistant Examiner.*